United States Patent
Miao et al.

(10) Patent No.: US 10,177,886 B2
(45) Date of Patent: Jan. 8, 2019

(54) METHOD AND APPARATUS FOR CONFIGURING A CLUSTER

(71) Applicant: Telefonaktiebolaget LM Ericsson (publ), Stockholm (SE)

(72) Inventors: Qingyu Miao, Beijing (CN); Qianxi Lu, Beijing (CN); Rui Fan, Beijing (CN); Zhang Zhang, Beijing (CN); Dennis Hui, Sunnyvale, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 60 days.

(21) Appl. No.: 14/896,919

(22) PCT Filed: Nov. 30, 2015

(86) PCT No.: PCT/CN2015/095989
§ 371 (c)(1),
(2) Date: Dec. 8, 2015

(87) PCT Pub. No.: WO2017/091947
PCT Pub. Date: Jun. 8, 2017

(65) Prior Publication Data
US 2017/0155481 A1  Jun. 1, 2017

(51) Int. Cl.
*H04L 5/00* (2006.01)
*H04W 76/15* (2018.01)
(Continued)

(52) U.S. Cl.
CPC ....... *H04L 5/0035* (2013.01); *H04W 72/0486* (2013.01); *H04W 76/15* (2018.02);
(Continued)

(58) Field of Classification Search
CPC .. H04B 7/024; H04L 5/0035; H04W 72/0486; H04W 76/025
See application file for complete search history.

(56) References Cited

U.S. PATENT DOCUMENTS

| | | | |
|---|---|---|---|
| 2010/0214943 A1* | 8/2010 | Immendorf | H04W 24/00 370/252 |
| 2011/0034171 A1* | 2/2011 | Choi | H04B 7/024 455/436 |

(Continued)

FOREIGN PATENT DOCUMENTS

| | | |
|---|---|---|
| CN | 105103593 A | 11/2015 |
| WO | 2015002389 A1 | 1/2015 |
| WO | 2015019171 A2 | 2/2015 |

OTHER PUBLICATIONS

International Search Report and Written Opinion for Application No. PCT/CN2015/095989, dated Aug. 22, 2016, 8 pages.
(Continued)

*Primary Examiner* — Scott M Sciacca
(74) *Attorney, Agent, or Firm* — NDWE LLP

(57) ABSTRACT

A method for configuring a cluster for a terminal device in a wireless network. The method is performed at a network node, such as a base station or a radio network controller. The terminal device can establish at least two concurrent connections to at least one network node in the cluster. The method comprises dynamically adjusting a configuration of the cluster and informing the terminal device of the adjusted configuration so that connectivity of the terminal device in the cluster is adapted to the adjusted configuration. Correspondingly, there is also provided an apparatus embodied at or as at least part of the network node.

18 Claims, 6 Drawing Sheets

(51) Int. Cl.
*H04B 7/024* (2017.01)
*H04W 72/04* (2009.01)
*H04W 16/28* (2009.01)
*H04W 84/04* (2009.01)
*H04W 76/20* (2018.01)

(52) U.S. Cl.
CPC ............ *H04W 16/28* (2013.01); *H04W 76/20* (2018.02); *H04W 84/042* (2013.01)

(56) References Cited

U.S. PATENT DOCUMENTS

| | | | |
|---|---|---|---|
| 2011/0170498 A1* | 7/2011 | Liu | H04L 5/0053 370/329 |
| 2015/0003329 A1* | 1/2015 | Morita | H04B 7/024 370/328 |

OTHER PUBLICATIONS

"3GPP TR 25.922, 3rd Generation Partnership Project; Technical Specification Group Radio Access Network; Radio resource management strategies (Release 7)," Mar. 2007, 95 pages, v7.1.0, 3GPP Organizational Partners, Valbonne, France.

"3GPP TS 25.302, 3rd Generation Partnership Project; Technical Specification Group Radio Access Network; Service provided by the physical layer (Release 11)," Jun. 2013, 102 pages, v11.4.0, 3GPP Organizational Partners, Valbonne, France.

"3GPP TS 25.331, 3rd Generation Partnership Project; Technical Specification Group Radio Access Network; Radio Resource Control (RRC); Protocol specification (Release 12)," Mar. 2015, 2225 pages, v12.5.0, 3GPP Organizational Partners, Valbonne, France.

"3GPP TR 36.842, 3rd Generation Partnership Project; Technical Specification Group Radio Access Network; Study on Small Cell enhancements for E-UTRA and E-UTRAN; Higher layer aspects (Release 12)," Dec. 2013, 71 pages, v12.0.0, 3GPP Organizational Partners, Valbonne, France.

Petar Popovski et al., "Scenarios, requirements and KPIs for 5G mobile and wireless system," Apr. 29, 2013, 84 pages, Document No. ICT-317669-METIS/D1.1, METIS.

International Preliminary Report on Patentability for Application No. PCT/CN2015/095989, dated Mar. 8, 2018, 9 pages.

Written Opinion for Application No. PCT/CN2015/095989, dated Aug. 22, 2016, 5 pages.

* cited by examiner

METHOD AND APPARATUS FOR CONFIGURING A CLUSTER

CROSS-REFERENCE TO RELATED APPLICATIONS

This application is a National stage of International Application No. PCT/CN2015/095989, filed Nov. 30, 2015, which is hereby incorporated by reference.

TECHNICAL FIELD

The non-limiting and exemplary embodiments of the present disclosure generally relate to the communications field, and specifically to a method, an apparatus, and a computer program product for configuring a cluster for a terminal device.

BACKGROUND

This section introduces aspects that may facilitate better understanding of the present disclosure. Accordingly, the statements of this section are to be read in this light and are not to be understood as admissions about what is in the prior art or what is not in the prior art.

Wireless 5G (fifth generation) systems will not only be "4G (fourth generation), but faster". One of novel features discussed in relation to 5G is Ultra-Reliable Communication (URC), an operation mode not present in today's wireless systems. URC refers to provision of a certain level of communication service almost 100% of the time. Example URC applications include reliable cloud connectivity, critical connections for industrial automation and reliable wireless coordination among vehicles. URC represents a new performance feature that needs to be targeted in designing future wireless systems. The URC in 5G is expected to place stringent requirements on connection reliability and latency. In an extreme case, the reliability greater than 99.999% might be required (see Mobile and wireless communications Enablers for the Twenty-twenty Information Society (METIS), Document Number: ICT-317669-METIS/D1.1). It is difficult to meet these requirements by means of single connectivity.

Moreover, the frequency range targeted in a non-backward compatible system in 5G, which may also be called NX (NeXt generation), covers 1 GHz up to 100 GHz. Due to addition of a high frequency spectrum to the cellular operation, high gain beamforming is a "must" to compensate negative effects due to unfavorable radio propagation properties. One issue with high gain beamforming is that a serving beam is optimal only for a small area, and expectedly a small fraction of time. When a user equipment (UE) moves, the serving beam may deteriorate very fast which makes UE mobility in NX a challenge.

In $3^{rd}$ Generation Partnership Project (3GPP) Long Term Evolution (LTE) Release 12, small cell enhancement has been studied. For higher layer enhancement, dual connectivity has been introduced to solve some problems, like power imbalance and mobility issues with densely deployment of small cells in heterogeneous networks. In 3GPP TR 36.842 V12.0.0, it is specified that a term "dual connectivity" is used to refer to an operation where a given UE consumes radio resources provided by at least two different network points connected with a non-ideal backhaul. Furthermore, each eNB involved in dual connectivity for a UE may assume different roles. Those roles do not necessarily depend on the eNB's power class and can vary among UEs. Dual connectivity consists in configuring a UE with one master eNB (MeNB) and at least one secondary eNB (SeNB). The UE can connect to one MeNB and one SeNB concurrently, while different frequencies are used between the MeNB and SeNB. The target of dual connectivity in LTE is to separate control plane from user plane and improve user throughput by aggregating transmissions from different nodes, but contributing less to system robustness or reliability and downlink/uplink decoupling.

SUMMARY

In order to provide a more reliable and robust system for NX, a new concept, which may be referred to as a "cluster" in terms of a number of access nodes or as multi-connectivity or multipoint-connectivity in terms of a number of concurrent connections, has been proposed, where multiple access nodes capable of providing multiple beams or connections form a cluster to serve a UE together. When the UE moves, if the beam from one access node deteriorates, other beams from the same or other nodes can ensure that the UE will still be served with good performance.

Multi-connectivity to some extent is an extension of LTE dual connectivity in NX. One UE can establish more than two connections concurrently over more than two respective beams from one or more network nodes. The one or more network nodes form a cluster to supply the more than two concurrent connections and coordinate with each other to serve the UE collectively. Similar to LTE DC, roles of different nodes in the cluster are different. There is one primary node called Cluster Head (CH), e.g. MeNB, which is responsible for setup/maintenance of the cluster, and other nodes in the cluster (if any) are serving nodes, e.g. SeNB, which may assist the CH to serve the UE. Different from LTE DC, for multi-connectivity in NX, the beams over which multiple connections are established could be from the CH, or from the CH and more than one serving node. The frequencies used in the cluster in NX can be the same or different depending on deployment. In addition to improving throughput as LTE DC, multi-connectivity in NX also needs to fulfill the requirement of improving robustness or reliability and DL/UL decoupling.

In 5G White Paper published by Next Generation Mobile Networks (NGMN) Alliance, it indicates that, in addition to supporting evolution of the established prominent mobile broadband use cases, 5G will support countless emerging use cases with a high variety of applications and variability of their performance attributes, from delay-sensitive video applications to ultra-low latency, from high speed entertainment applications in a vehicle to mobility on demand for connected objects, and from best effort applications to reliable and ultra-reliable ones such as health and safety. Moreover, use cases will be delivered across a wide range of devices (e.g., smartphone, wearable, Machine Type Communication (MTC)) and across a fully heterogeneous environment. NGMN has developed twenty five use cases for 5G, as representative examples, which are grouped into eight use case families. The 5G system also includes a great deal of growing use cases with massive number of devices (e.g., sensors, actuators and cameras) with a wide range of characteristics and demands. This family will include low-cost/long-range/low-power MTC.

With such a high variety of use cases targeted by 5G, there will be a large range of mixed types of services directed to UEs, for example, some services require URC, while some services only care about high throughput. In this case, if a fixed or invariable cluster is configured for a UE, even though multi-connectivity is configured, the multi-connectivity may not provide optimal performance with regard to various services for the UE. Furthermore, since the cluster is specific to a UE, there is an overlap between clusters for different UEs. If handover occurs among UE-specific clusters, coordination needs to be performed by different cluster heads. This coordination may occupy too many resources in the backhaul and air interface.

In order to solve at least part of the above mentioned issues, various embodiments of the present disclosure provide a solution for flexibly and dynamically configuring a cluster. Other features and advantages of embodiments of the present disclosure will also be understood from the following description of specific embodiments when read in conjunction with the accompanying drawings, which illustrate the principles of embodiments of the present disclosure.

In a first aspect of the present disclosure, there is provided a method for configuring a cluster for a terminal device in a wireless network. The method is performed at a network node, e.g. a base station or a radio network controller. The terminal device can establish at least two concurrent connections to at least one network node in the cluster. The method comprises dynamically adjusting a configuration of the cluster; and informing the terminal device of the adjusted configuration so that connectivity of the terminal device in the cluster is adapted to the adjusted configuration.

In an embodiment, dynamically adjusting the configuration of the cluster may comprise adjusting at least one of the following: one or more of a set of parameters for adding or removing a connection into or from the cluster, a number of concurrent connections, one or more of a set of parameters for switching between the concurrent connections for transmission, and one or more of a set of parameters for cluster head re-allocation.

In another embodiment, dynamically adjusting the configuration of the cluster may be based on at least one of the following: a service type for the terminal device; a traffic load of the at least one network node; and deployment of the wireless network.

In a further embodiment, the traffic load may be indicated by at least one of the following: a number of active terminal devices under the at least one network node; a ratio of the overlapped cluster; a fraction of radio resources that is not scheduled during a predetermined time period at each of the at least one network node; and how full a buffer at each of the at least one network node is.

In another embodiment, the deployment may comprise a high radio link failure area and a high speed area.

In yet another embodiment, the method may further comprise informing at least one network node other than said network node, to which the terminal device establishes a connection based on the adjusted configuration, of the adjusted cluster configuration.

In yet another embodiment, the adjustment of the configuration of the cluster may be specific to a network node serving the terminal device, to the terminal device or to traffic of the terminal device.

In yet another embodiment, adjusting the configuration of the cluster may comprise disabling the cluster for the terminal device.

By means of this method, a cluster can be configured flexibly and dynamically for a terminal device according to various factors, such as service types for the terminal device, a traffic load of the cluster or of respective network nodes and deployment of the wireless network.

In a second aspect of the present disclosure, there is provided a method for adapting connectivity to cluster adjustment. This method is performed at a terminal device to be served by at least one network node in a cluster specific to the terminal device. The method comprises establishing at least two concurrent connections to the at least one network node in the cluster and receiving information with regard to an adjusted configuration of the cluster from one of the at least one network node. The method further comprises adapting connectivity of the terminal device in the cluster to the adjusted configuration.

In an embodiment, the adjustment of the configuration of the cluster may comprise adjustment of at least one of the following: one or more of a set of parameters for adding or removing a connection into or from the cluster, a number of the concurrent connections, one or more of a set of parameters for switching between the concurrent connections for transmission, and one or more of a set of parameters for cluster head re-allocation.

In another embodiment, the adjustment of the configuration of the cluster may be based on at least one of the following: a service type for the terminal device; a traffic load of the at least one network node; and deployment of the wireless network.

By means of this method, the terminal device can flexibly establish concurrent connections when necessary, thereby improving communication reliability and resource utilization efficiency.

In a third aspect of the present disclosure, there is provided an apparatus adapted for configuring a cluster for a terminal device in a wireless network. The apparatus may be embodied at or as at least part of a network node in the cluster. The terminal device can establish at least two concurrent connections to at least one network node in the cluster. The apparatus comprises an adjusting unit configured to dynamically adjust a configuration of the cluster and an informing unit configured to inform the terminal device of the adjusted configuration so that connectivity of the terminal device in the cluster is adapted to the adjusted configuration.

In a fourth aspect of the present disclosure, there is provided an apparatus for adapting connectivity to cluster adjustment. The apparatus may be embodied at or as at least part of a terminal device to be served by at least one network node in a cluster specific to the terminal device. The apparatus comprises a connection establishing unit configured to establish at least two concurrent connections to the at least one network node in the cluster and a receiving unit configured to receive information with regard to an adjusted configuration from one of the at least one network node. The apparatus further comprises an adapting unit configured to adapt connectivity of the terminal device in the cluster to the adjusted configuration.

In a fifth aspect of the present disclosure, there is provided an apparatus adapted for configuring a cluster for a terminal device in a wireless network. The apparatus may be embodied at or as at least part of a network node in the cluster. The terminal device can establish at least two concurrent connections to at least one network node in the cluster. The apparatus comprises a processor and a memory. The memory contains instructions executable by the processor, whereby the apparatus is operative to perform the method according to the first aspect of the present disclosure.

In a sixth aspect of the present disclosure, there is provided an apparatus for adapting connectivity to cluster adjustment. The apparatus may be embodied at or as at least part of a terminal device to be served by at least one network node in a cluster specific to the terminal device. The apparatus comprises a processor and a memory. The memory contains instructions executable by the processor, whereby the apparatus is operative to perform the method according to the second aspect of the present disclosure.

In a seventh aspect of the present disclosure, there is provided an apparatus adapted for configuring a cluster for a terminal device in a wireless network. The apparatus may be embodied at or as at least part of a network node in the cluster. The terminal device can establish at least two concurrent connections to at least one network node in the cluster. The apparatus comprises processing means adapted to perform the method according to the first aspect of the present disclosure.

In an eight aspect of the present disclosure, there is provided an apparatus for adapting connectivity to cluster adjustment. The apparatus may be embodied at or as at least part of a terminal device to be served by at least one network node in a cluster specific to the terminal device. The apparatus comprises processing means adapted to perform the method according to the second aspect of the present disclosure.

In a ninth aspect of the present disclosure, there is provided a computer program product, comprising instructions which, when executed on at least one processor, cause the at least one processor to carry out the method according to the first or second aspect of the present disclosure.

It shall be appreciated that various embodiments of the first aspect may also be equally applied to the third, fifth, seventh and ninth aspect of the present disclosure, while various embodiments of the second aspect may also be equally applied to the fourth, sixth, eighth and ninth aspect of the present disclosure

BRIEF DESCRIPTION OF THE DRAWINGS

The above and other aspects, features, and benefits of various embodiments of the present disclosure will become more fully apparent from the following detailed description with reference to the accompanying drawings, in which.

Like reference numbers and designations in the various drawings indicate like elements.

DETAILED DESCRIPTION

Figure 1:
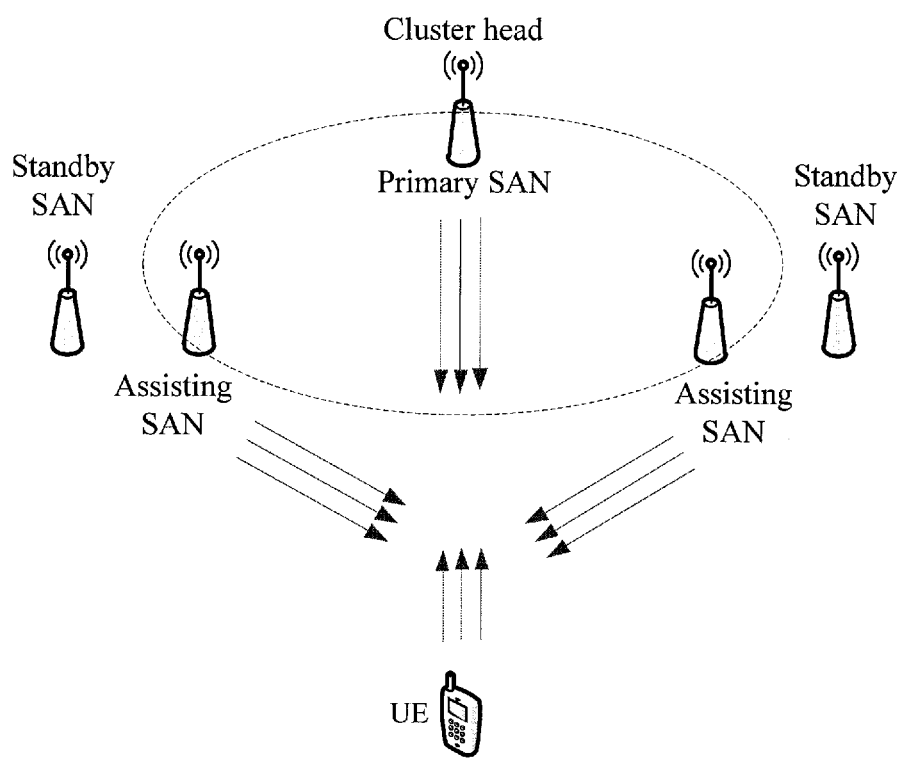
FIG. 1 shows example architecture of a UE-specific serving cluster.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "an embodiment," "another embodiment," "yet another embodiment," etc. indicate that the embodiment described may include a particular feature, structure, or characteristic, but every embodiment may not necessarily include the particular feature, structure, or characteristic. Moreover, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms in association.

The terminology used herein is for the purpose of describing particular embodiments only and is not intended to limit the embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "network node" used herein may refer to a base station, which may also be referred to as Access Point, Access node (AN), eNB, eNodeB, NodeB or base transceiver station (BTS) etc. depending on the technology and terminology used, or a central node, like a Radio Network Controller (RNC) depending on the technology and terminology used. The term "terminal device" or "UE" used herein may refer to any terminal having wireless communications capabilities, including but not limited to, mobile phones, cellular phones, smart phones, or personal digital assistants (PDAs), portable computers, image capture devices such as digital cameras, gaming devices, music storage and playback appliances and any portable units or terminals that have wireless communications capabilities, or Internet appliances permitting wireless Internet access and browsing and the like. The terms "terminal device" and "UE" may be used interchangeably in this document. The term "cluster" or "serving cluster" used herein is specific to a terminal device and consists of a group of network nodes, in which at least two concurrent connections can be established for the terminal device. A connection is established based on a beam from one of the network nodes in the cluster. Hereafter, the terms "connection" and "beam" may be used interchangeably sometimes. The term "multi-connectivity" used herein refers to a feature of a cluster specific to a terminal device and represents that multiple connections can be established for the terminal device.

For better understanding of the present disclosure, FIG. 1 illustrates example architecture of a UE-specific serving cluster.

As illustrated, the UE-specific serving cluster comprises three access nodes (ANs) that are located in the vicinity of the UE and are ready to serve the UE. The cluster head, which is also the primary serving AN (SAN), is in charge of coordination of the cluster so as to control fast beam switching and also responsible for setup and maintenance of the cluster. Other two ANs assist the cluster head to serve the UE, which may be called assisting SAN. The UE can establish multiple concurrent connections via multiple beams from the cluster head, or from the cluster head and at least one assisting SAN. The frequency used for the multiple concurrent connections in the cluster may be the same or different, depending on deployment. As illustrated in FIG. 1, the UE establishes three connections concurrently with the cluster head and the two assisting serving access nodes, respectively.

It shall be appreciated that the maximum number of concurrent connections that can be established for a UE in a cluster depends on the number of network nodes, e.g. ANs, comprised in the cluster and the number of beams supported by each network node.

It shall also be appreciated that FIG. 1 merely gives an example of a serving cluster configured for a UE. The ANs are illustrated as one example of cluster members, which may also be other network nodes, such as a central node, like RNC.

Once a cluster is configured for a UE, with a change in various conditions, such as a traffic load of serving network nodes in the cluster and service types for the UE, and a change in deployment caused by UE movement etc., the configured cluster may become non-optimal anymore in terms of resource utilization and communication reliability etc. Accordingly, several embodiments of the present disclosure provide a solution for configuring a cluster more flexibly and dynamically.

Figure 2:
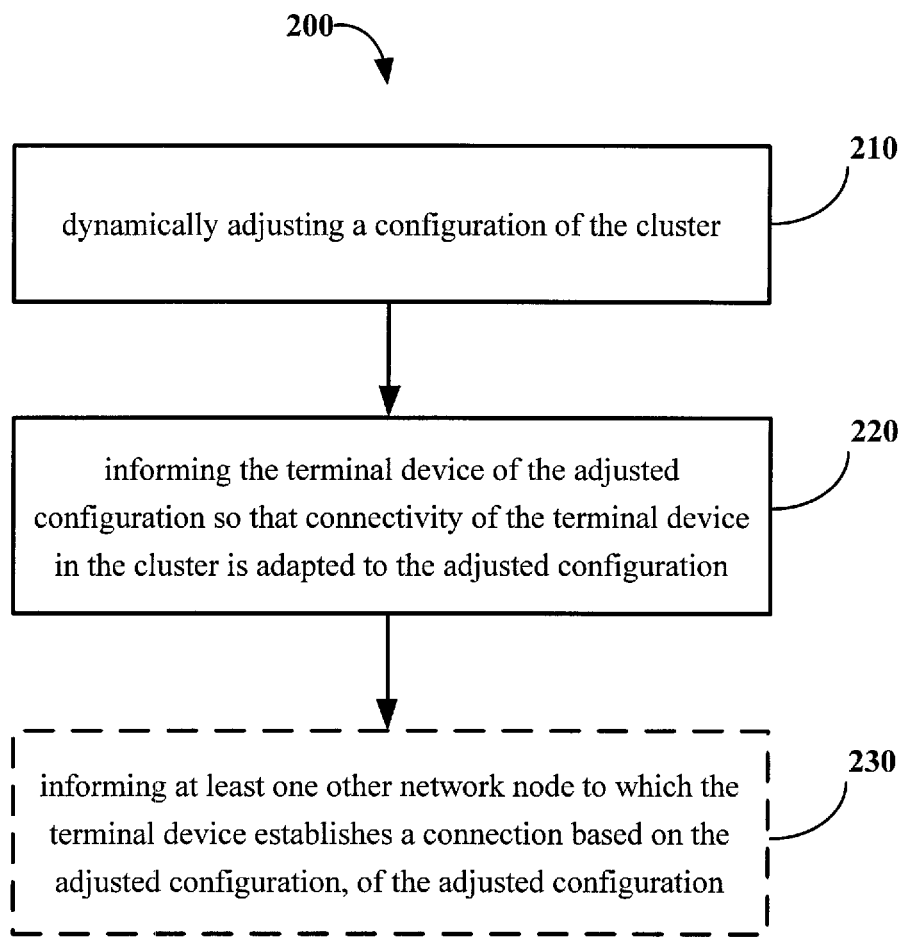
FIG. 2 illustrates a flowchart of a method for configuring a cluster for a terminal device in a wireless network according to an embodiment of the present disclosure.

FIG. 2 illustrates a flowchart of a method 200 for configuring a cluster for a terminal device in a wireless network according to an embodiment of the present disclosure. The method 200 is performed at a network node, which may be a base station or a central node and serve as a cluster head in the configured cluster. The terminal device can establish at least two concurrent connections to at least one network node in the cluster.

As illustrated, the method 200 enters at block 210, in which a configuration of the cluster is dynamically adjusted at the network node. Then at block 220, the adjusted configuration is informed to the terminal device directly or via another network node in the cluster so that connectivity of the terminal device in the cluster can be adapted to the adjusted configuration.

Particularly, at block 210, at least one of the following factors can be dynamically adjusted: one or more of a set of parameters for adding or removing a connection into or from the cluster, a number of the concurrent connections, one or more of a set of parameters for switching between the concurrent connections for transmission, and one or more of a set of parameters for cluster head re-allocation.

In an embodiment, the set of parameters for adding or removing a connection into or from the cluster may comprise two Time to Trigger (TTT) parameters TTT1, TTT2 and two offsets X1dB, YdB, in which TTT1 and X1dB are used for adding a connection, while TTT2 and YdB are used for removing a connection. For example, when quality of a candidate connection is X1dB better than quality of the currently best connection in the cluster for time TTT1, the candidate connection can be added into the cluster. When quality of one existing connection in the cluster is YdB worse than the quality of the currently best connection in the cluster for time TTT2, this connection will be removed from the cluster.

As to the configured cluster for the terminal device, the number of concurrent connections established for the terminal device may be adjusted in another embodiment. The maximum number of concurrent connections that can be established for the terminal device relies on the number of network nodes comprised in the cluster and the number of beams allowed in each network node in the cluster. If the number of concurrent connections is set to 1 for the terminal device, multi-connectivity is disabled for that terminal device. If the number of concurrent connections is set large for the terminal device, communication robustness for that terminal device may be improved.

In the configured cluster, transmission (TX) for the terminal device can be switched among different concurrent connections. As mentioned above, the connection can be established based on a beam. Therefore, switching among different connections is equivalent to switching among different beams. Hereafter, the terms "connection" and "beam" may be interchangeably used. If a connection with the best quality is always selected for transmission, there may be frequent TX switching among different connections. In some cases, such as when there is a non-ideal backhaul between transmitting network nodes, the frequent TX switching among different connections is not a best choice for causing a long delay or high overhead. Also, in order to switch among different connections, the terminal device needs to measure connection quality respectively for a serving connection and a non-serving connection based on a training signal (TRN) and to report it to the serving network node. Then, quality of the serving connection and quality of the non-serving connection can be compared. If the quality of the non-serving connection in the cluster is X2dB larger than the quality of the serving connection, the non-serving connection can be selected as a serving connection. In order to have a slow beam switching for lossless traffic, the value of X2 may be set to a large value. Furthermore, a hysteresis time may be added after getting the measurement report from the terminal device to avoid a ping-pong effect. If there is little performance loss caused by the ping-pong effect (e.g. intra-node switching), the hysteresis time may be set to a small value, even to zero. The hysteresis time and the threshold (X2dB) may be set different for different beams or connections from the same node and for different beams or connections from different network nodes in the cluster. In an embodiment, the set of parameters for switching between the concurrent connections for transmission may comprise the hysteresis time and the threshold X2dB.

Additionally, for the configured cluster, the cluster head or primary severing network node may be re-allocated. The re-allocation may also be based on the measurement report from the terminal device. The re-allocated cluster head may be a network node that can provide most services for the terminal device or offer the best QoS for the terminal device, etc. Similar to connection switching for transmission, a threshold and a hysteresis time may also be set for the cluster head. For example, if the QoS offered by the current cluster head is X3dB worse than the QoS offered by another serving network node, the cluster head may be re-allocated to the other network node. In order to avoid frequent re-allocation of the cluster head, the value of X3 may be set to a large value. Furthermore, a hysteresis time may be added after getting the measurement report from the terminal device to avoid a ping-pong effect. In an embodiment, the set of parameters for cluster head re-allocation may comprise the threshold X3dB and the hysteresis time as mentioned above.

In some embodiments, the configuration of the cluster may be dynamically adjusted based on at least one of the following: a service type for the terminal device; a traffic load of the at least one network node; and deployment of the wireless network.

Figure 3:
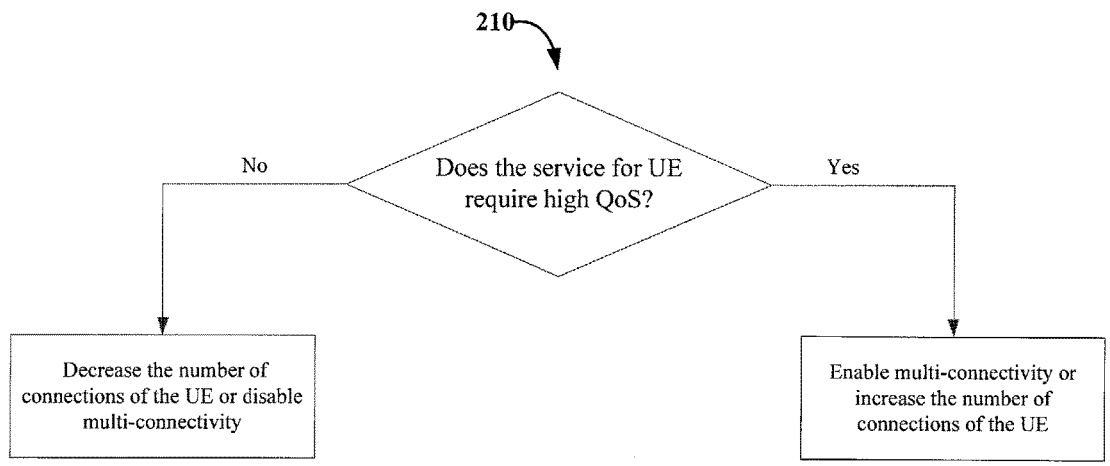
FIG. 3 illustrates a specific flow descriptive of how to adjust the configuration of the cluster according to an embodiment of the present disclosure.

FIG. 3 shows a specific flow for block 210 of FIG. 2 descriptive of how to adjust the configuration of the cluster according to an embodiment of the present disclosure.

In this embodiment, the configuration of the cluster may be adjusted according to the service type for the terminal device. The service type may be defined based on a requirement on QoS. Based on the service types with different QoS, the cluster can be configured to have full multi-connectivity (:i.e. the number of connections in the cluster is set to the allowed maximum), limited multi-connectivity (i.e. the number of connections in the cluster is set to be less than the allowed maximum but more than 1) or no multi-connectivity (i.e. the number of connections for the terminal device in the cluster is set to 1).

If services directed to the terminal device require low QoS (e.g. lower than a first predetermined QoS threshold), e.g. interruption and latency tolerant services, such as the best effort applications, multi-connectivity may not be a must. In such a case, the number of concurrent connections configured for the terminal device may be decreased, if available radio resources are not sufficient. In an extreme case, the number of concurrent connections may be decreased to 1, which means the multi-connectivity is disabled for the terminal device. If services directed to the terminal device require high QoS (e.g. higher than a second predetermined QoS threshold), e.g. reliable and ultra-reliable applications, multi-connectivity will be enabled most time, which means the number of concurrent connections needs to be increased, e.g. to be larger than the number of concurrent connections established for the services requiring low QoS. In some cases, the first and second predetermined QoS thresholds may be set to the same. Preferably, multi-connectivity will be enabled in a best-effort way, e.g. when there are sufficient spare resources, for further performance improvement. In this regard, the adjustment for the configuration of the cluster is specific to the terminal device.

Figure 4:
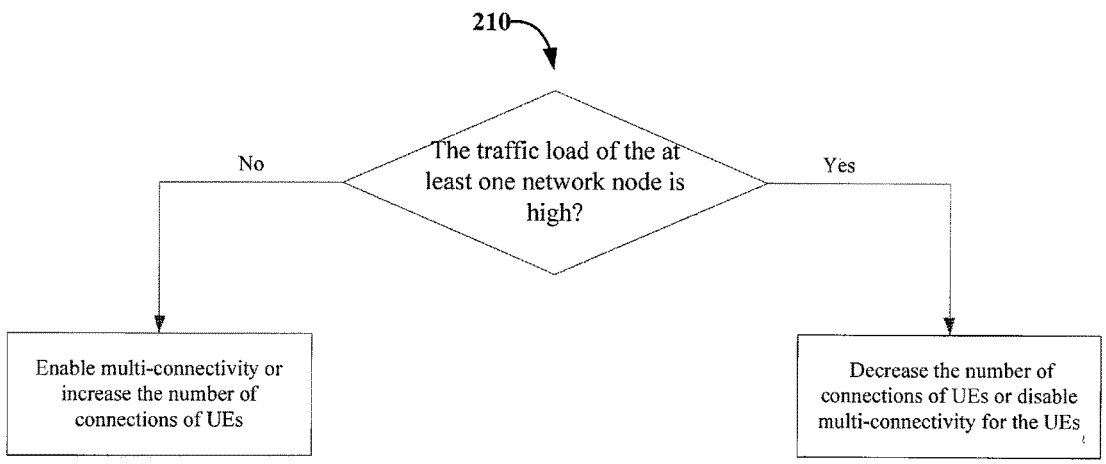
FIG. 4 illustrates another specific flow descriptive of how to adjust the configuration of the cluster according to an embodiment of the present disclosure.

FIG. 4 shows another specific flow for block 210 of FIG. 2 descriptive of how to adjust the configuration of the cluster according to an embodiment of the present disclosure.

In this embodiment, the number of concurrent connections in the cluster may be adjusted according to the traffic load of the cluster so as to reduce a possibility of resource conflicition and efficiently utilize available resources. The traffic load of the cluster may be defined by the number of active terminal devices in the cluster. If the traffic load of the cluster becomes low (e.g. lower than a first predetermined threshold), most of terminal devices in the cluster may be configured with multi-connectivity. As for the terminal device for which the cluster is already configured, the number of concurrent connections that can be established for the terminal device may be increased.

If the traffic load of the cluster becomes high (e.g. higher than a second predetermined threshold), most of terminal devices in the cluster may not be configured with multi-connectivity. As for the terminal device for which the cluster is already configured, the number of concurrent connections that can be established may be decreased. In an extreme case, the number of concurrent connections may be decreased to 1, which means the multi-connectivity is disabled for the terminal device. Preferably, the number of connections for services requiring low QoS may be decreased more. In some cases, the first and second predetermined thresholds may be set to the same.

For a UE specific cluster, a ratio of the overlapped cluster may be used as a load indicator. Particularly, the ratio of the overlapped cluster refers to a ratio of a part of the cluster that is overlapped with any of other clusters configured for other UEs to the whole cluster. In addition, a fraction of radio resources that is free and has not been scheduled during a predetermined time period at each network node controlled by the cluster head may also be a load indicator. The traffic load may be measured/considered at beam level. Other possibilities for indicating the traffic load include a certain measure of how full a buffer at each network node controlled by the cluster head is.

In another embodiment, the adjustment according to the traffic load may be specific to a network node. The load of a network node may be identified by the number of active terminal devices under coverage of the network node. For a network node in the cluster having a low traffic load, e.g. lower than a predetermined threshold, most of terminal devices may be configured with multi-connectivity from this network node, while with the increased traffic load, the number of connections from this network node will be decreased.

In some other embodiments, the configuration of the cluster may be adjusted according to deployment of the wireless network.

For non-ideal backhaul, e.g. switching based deployment with a longer delay, the multi-connectivity may be preferably configured from a same network node. Therefore, the concurrent connections may be established from the same network node in the cluster to the terminal device when possible.

Additionally, for an area where it is expected to have a quick drop of radio signals, which area may be referred to as High Radio Link Failure area, multi-connectivity is preferably configured for terminal devices in this area. It has been shown that there could be a sudden deterioration of signal to interference plus noise ratio (SINR) of a serving beam due to shadowing, e.g. in "around the corner" situations. The SINR of the serving beam may drop by over 20 dB within 5-10 ms. Such an occasional drop will be unavoidable at above 10 GHz. For this area, multi-connectivity needs to be enabled. In other words, if the terminal device moves into this area, the number of connections established concurrently for the terminal device may be increased.

For an area where a terminal device moves in a high speed, which area may be referred to as High Speed area, multiple beams or connections may be configured for the terminal device in this area from different network nodes. Alternatively, when there is a beam having good quality and a wide beam width and that can be allocated for the terminal device, there is no need to enable multi-connectivity for the terminal device so as to save resources, if the throughput boost is not the target for services directed to the terminal device. In such a case, the adjustment of the cluster configuration is specific to the terminal device.

For a terminal device with mixed traffic types, traffic flows can be separated into different bearers for different traffic types. The bearers for seamless traffic can support inter-network node fast beam switching, which can be delivered through different network nodes in the cluster. The bearers for lossless traffic can be delivered through one network node (e.g. the primary network node) without inter-network node fast beam switching. Therefore, when configuring the cluster for the terminal device, which network node(s) the multiple connections are established from may be adjusted depending on traffic types for the terminal device.

Now reference is made back to FIG. 2. If the cluster comprises two or more network nodes, the method 200 may further comprise informing at least one other network node to which the terminal device establishes a connection based on the adjusted configuration, of the adjusted cluster configuration at block 230. With knowledge of the adjusted configuration, the at least one other network node may accordingly implement the adjustment, e.g. updating the configuration, adding or removing one or more connections to the terminal device.

By means of method 200, a cluster can be configured flexibly and dynamically for a terminal device according to various factors, such as service types for the terminal device, a traffic load of the cluster or respective network nodes and deployment of the wireless network.

Figure 5:
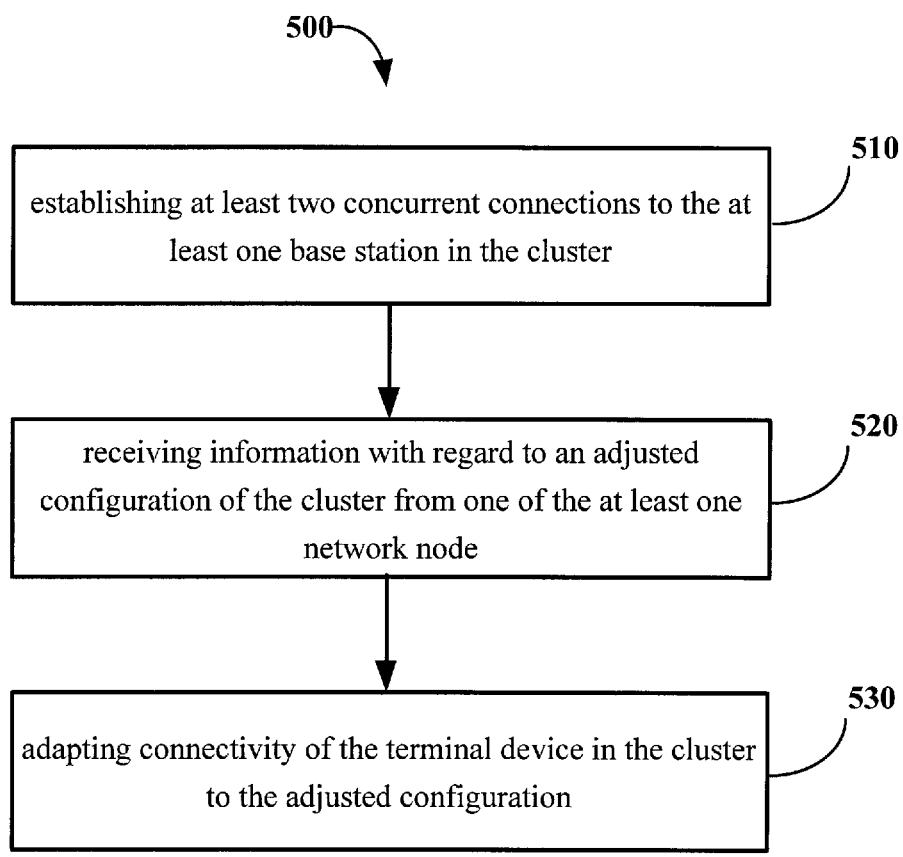
FIG. 5 illustrates a flowchart of a method for adapting connectivity to cluster adjustment according to an embodiment of the present disclosure.

FIG. 5 illustrates a flowchart of a method 500 for adapting connectivity to cluster adjustment according to an embodiment of the present disclosure. The method 500 is performed at a terminal device to be served by at least one network node in a cluster specific to the terminal device.

As illustrated, the method 500 enters at block 510, in which at least two concurrent connections are established to the at least one network node in the cluster. Then at block 520, information with regard to an adjusted configuration of the cluster is received from one of the at least one network node. Accordingly, connectivity of the terminal device in the cluster is adapted to the adjusted configuration at block 530. For example, the terminal device may initiate establishment of more connections to different network nodes according to the adjusted configuration.

As described above with reference to FIG. 2, the adjustment of the configuration of the cluster may comprise adjustment of at least one of the following: one or more of a set of parameters for adding or removing a connection into or from the cluster, a number of the concurrent connections, one or more of a set of parameters for switching between the concurrent connections for transmission, and one or more of a set of parameters for cluster head re-allocation.

In some embodiments, the adjustment of the configuration of the cluster may be based on at least one of the following: a service type for the terminal device; a traffic load of the at least one network node; and deployment of the wireless network.

Particular details of how to adjust the configuration of the cluster have been described above, which thus will not be repeated for the purpose of simplicity.

Figure 6:
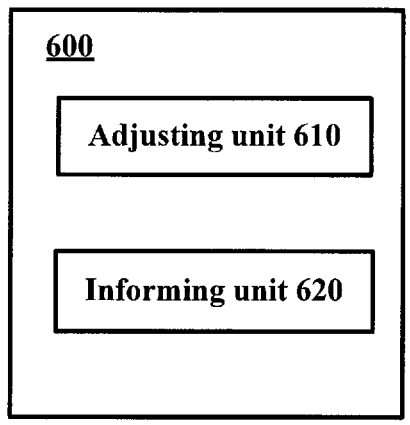
FIG. 6 illustrates a schematic block diagram of an apparatus adapted for configuring a cluster for a terminal device in a wireless network according to an embodiment of the present disclosure.

FIG. 6 illustrates a schematic block diagram of an apparatus 600 adapted for configuring a cluster for a terminal device in a wireless network according to an embodiment of the present disclosure. The apparatus 600 may be embodied at or as at least part of a network node in the cluster. In the cluster, the terminal device can establish at least two concurrent connections to at least one network node.

As illustrated, the apparatus 600 comprises an adjusting unit 610 and an informing unit 620. The adjusting unit 610 is configured to dynamically adjust a configuration of the cluster. The informing unit 620 is configured to inform the terminal device of the adjusted configuration so that connectivity of the terminal device in the cluster is adapted to the adjusted configuration.

In an embodiment, the adjusting unit 610 may be configured to adjust at least one of the following: one or more of a set of parameters for adding or removing a connection into or from the cluster, a number of concurrent connections, one or more of a set of parameters for switching between the concurrent connections for transmission, and one or more of a set of parameters for cluster head re-allocation.

In another embodiment, the adjusting unit 610 may further be configured to adjust the configuration of the cluster based on at least one of the following: a service type for the terminal device; a traffic load of the at least one network node; and deployment of the wireless network. For example, the deployment may comprise a high radio link failure area and a high speed area.

In a further embodiment, the service type may be based on required quality of service, QoS. The adjusting unit 610 may further be configured to decrease a number of concurrent connections of the terminal device, if the required QoS is lower than a first predetermined threshold and to increase the number of concurrent connections of the terminal device, if the required QoS is higher than a second predetermined threshold. In some cases, the first and second predetermined thresholds may be set to the same.

In another embodiment, the adjusting unit 610 may further be configured to decrease a number of concurrent connections of the terminal device, if the traffic load of the at least one network node is higher than a first predetermined threshold and to increase the number of concurrent connections of the terminal device, if the traffic load of the at least one network node is lower than a predetermined second threshold. In some cases, the first and second predetermined thresholds may be set to the same.

In yet another embodiment, the traffic load may be indicated by at least one of the following: a number of active terminal devices under the at least one network node; a ratio of the overlapped cluster; a fraction of radio resources that is not scheduled during a predetermined time period at each of the at least one network node; and how full a buffer at each of the at least one network node is.

In yet another embodiment, the informing unit 620 may further be configured to inform at least one network node other than said network node, to which the terminal device establishes a connection based on the adjusted configuration, of the adjusted cluster configuration.

In yet another embodiment, the adjustment of the configuration of the cluster may be specific to a network node serving the terminal device, to the terminal device or to traffic of the terminal device.

In yet another embodiment, the adjusting unit 620 may further be configured to disable the cluster for the terminal device.

The above units 610 and 620 may be configured to implement corresponding operations or steps and to achieve corresponding technical effects as described with reference to FIG. 2-4, and thus will not be detailed herein for the purpose of simplicity.

Figure 7:
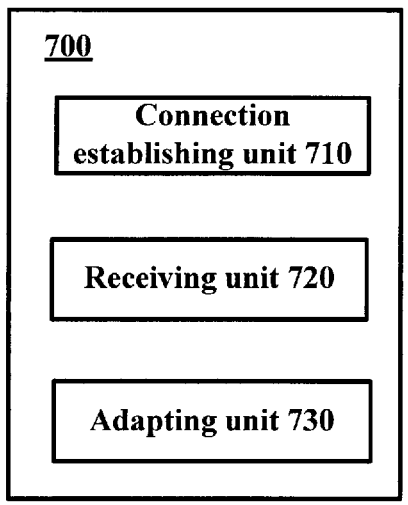
FIG. 7 illustrates a schematic block diagram of an apparatus for adapting connectivity to cluster adjustment according to an embodiment of the present disclosure.

FIG. 7 illustrates a schematic block diagram of an apparatus 700 for adapting connectivity to cluster adjustment according to an embodiment of the present disclosure. The apparatus 700 may be embodied at or as at least part of a terminal device to be served by at least one network node in a cluster specific to the terminal device.

Particularly, the apparatus 700 comprises a connection establishing unit 710, a receiving unit 720 and an adapting unit 730. The connection establishing unit 710 is configured to establish at least two concurrent connections to the at least one network node in the cluster. The receiving unit 720 is configured to receive information with regard to an adjusted configuration from one of the at least one network node. The adapting unit 730 is configured to adapt connectivity of the terminal device in the cluster to the adjusted configuration.

In an embodiment, the adjustment of the configuration of the cluster may comprise adjustment of at least one of the following: one or more of a set of parameters for adding or removing a connection into or from the cluster, a number of the concurrent connections, one or more of a set of parameters for switching between the concurrent connections for transmission, and one or more of a set of parameters for cluster head re-allocation.

In a further embodiment, the adjustment of the configuration of the cluster may be based on at least one of the following: a service type for the terminal device; a traffic load of the at least one network node; and deployment of the wireless network.

The above units 710-730 may be configured to implement corresponding operations or steps and to achieve corresponding technical effects as described with reference to FIG. 5, and thus will not be detailed herein for the purpose of simplicity.

Figure 8:
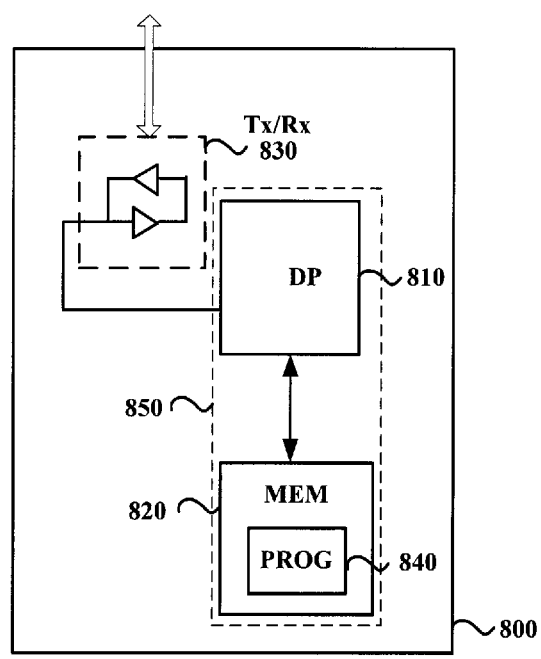
FIG. 8 illustrates a schematic block diagram of a general apparatus according to an embodiment of the present disclosure.

FIG. 8 illustrates a schematic block diagram of a general apparatus 800 according to an embodiment of the present disclosure. In some implementations, the apparatus 800 may be embodied at or as at least part of a network node for configuring a cluster for a terminal device in a wireless network. In some other implementations, the apparatus 800 may be embodied at or as at least part of at terminal device for adapting connectivity to cluster adjustment.

The apparatus 800 comprises at least one processor 810, such as a data processor (DP) and at least one memory (MEM) 820 coupled to the processor 810. The apparatus 800 may further comprise a transmitter TX and receiver RX 830 coupled to the processor 810 for establishing connections with other devices or nodes. The MEM 820 stores a program (PROG) 840. In some implementations, the PROG 840 may include instructions that, when executed on the associated processor 810, enable the apparatus 800 to operate in accordance with the embodiments of the present disclosure, for example to perform the method 400 with reference to FIGS. 2-4. In some other implementations, the PROG 840 may include instructions that, when executed on the associated processor 810, enable the apparatus 800 to operate in accordance with the embodiments of the present disclosure, for example to perform the method 500 with reference to FIG. 5. A combination of the at least one processor 810 and the at least one MEM 820 may form processing means 850 adapted to implement some embodiments of the present disclosure with reference to FIGS. 2-4 in some implementations or to implement other embodiments with reference to FIG. 5 in some other implementations.

The MEM 820 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 810 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these functional modules/units described as embodiments of the present disclosure may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

A person skilled in the art shall appreciate that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a network node for configuring a cluster for a terminal device in a wireless network, wherein the cluster includes a plurality of network nodes in which respective network nodes are capable of communicating with the terminal device by multiple concurrent connections via multiple beams, and wherein the terminal device establishes at least two concurrent connections to at least one network node in the cluster, the method comprising:
   dynamically adjusting a configuration of the cluster by decreasing a number of the at least two concurrent connections, when a traffic load of the cluster exceeds a predetermined threshold, wherein the traffic load is indicated by a ratio of a part of the cluster, that is overlapped with one or more other clusters configured for other terminal devices, to a whole of the cluster; and
   informing the terminal device of the adjusted configuration so that connectivity of the terminal device in the cluster is adapted to the adjusted configuration.

2. The method according to claim 1, wherein the dynamically adjusting the configuration of the cluster further comprises adjusting at least one of the following:
   one or more of a set of parameters for removing a connection from the cluster;
   one or more of a set of parameters for switching between the concurrent connections for transmission; and
   one or more of a set of parameters for cluster head re-allocation.

3. The method according to claim 1, wherein the dynamically adjusting the configuration of the cluster is further based on at least one of the following:
   a service type for the terminal device; and
   deployment of the wireless network.

4. The method according to claim 3, wherein the deployment comprises at least one of a high radio link failure area and a high speed area.

5. The method according to claim 1, further comprising:
   informing at least one network node other than said network node, to which the terminal device establishes a connection based on the adjusted configuration.

6. The method according to claim 1, wherein the dynamically adjusting the configuration of the cluster further comprises disabling the cluster for the terminal device.

7. A method at a terminal device to communicate with at least one network node in a cluster, wherein the cluster includes a plurality of network nodes in which respective network nodes are capable of communicating with the terminal device by multiple concurrent connections via multiple beams, the method comprising:
   establishing at least two concurrent connections to the at least one network node in the cluster;
   receiving information with regard to an adjusted configuration of the cluster from one of the at least one network node, wherein the adjusted configuration decreases a number of the at least two concurrent connections, when a traffic load of the cluster exceeds a predetermined threshold, and wherein the traffic load is indicated by a ratio of a part of the cluster, that is overlapped with one or more other clusters configured for other terminal devices, to a whole of the cluster; and
   adapting connectivity of the terminal device in the cluster to the adjusted configuration.

8. The method according to claim 7, wherein the adjusted configuration of the cluster further comprises adjustment by at least one of the following:
   one or more of a set of parameters for removing a connection from the cluster;
   one or more of a set of parameters for switching between the concurrent connections for transmission; and
   one or more of a set of parameters for cluster head re-allocation.

9. The method according to claim 7, wherein the adjusted configuration of the cluster is based on at least one of the following:
   a service type for the terminal device; and
   deployment of a wireless network that includes the terminal device.

10. An apparatus at a network node for configuring a cluster for a terminal device in a wireless network, wherein the cluster includes a plurality of network nodes in which respective network nodes are capable of communicating with the terminal device by multiple concurrent connections via multiple beams, and wherein the terminal device to establish at least two concurrent connections to at least one network node in the cluster, the apparatus comprising:
   a processor; and
   a memory containing program instructions which, when executed by the processor, cause the apparatus to:
      dynamically adjust a configuration of the cluster by decreasing a number of the at least two concurrent connections, when a traffic load of the cluster exceeds a predetermined threshold, wherein the traffic load is indicated by a ratio of a part of the cluster, that is overlapped with one or more other clusters configured for other terminal devices, to a whole of the cluster; and
      inform the terminal device of the adjusted configuration so that connectivity of the terminal device in the cluster is adapted to the adjusted configuration.

11. The apparatus according to claim 10, wherein the program instructions which, when executed by the processor, further cause the apparatus to adjust at least one of the following:
   one or more of a set of parameters for removing a connection from the cluster;
   one or more of a set of parameters for switching between the concurrent connections for transmission; and
   one or more of a set of parameters for cluster head re-allocation.

12. The apparatus according to claim 10, wherein the program instructions which, when executed by the processor, further cause the apparatus to adjust the configuration of the cluster based on at least one of the following:
   a service type for the terminal device; and
   deployment of the wireless network.

13. The apparatus according to claim 12, wherein the deployment comprises at least one of a high radio link failure area and a high speed area.

14. The apparatus according to claim 10, wherein the program instructions which, when executed by the processor, further cause the apparatus to inform at least one network node other than said network node, to which the terminal device establishes a connection based on the adjusted configuration.

15. The apparatus according to claim 10, wherein the program instructions which, when executed by the processor, further cause the apparatus to disable the cluster for the terminal device.

16. An apparatus at a terminal device to communicate with at least one network node in a cluster, wherein the cluster includes a plurality of network nodes in which respective network nodes are capable of communicating with the terminal device by multiple concurrent connections via multiple beams, the apparatus comprising:
　a processor; and
　a memory containing program instructions which, when executed by the processor, cause the apparatus to:
　　establish at least two concurrent connections to the at least one network node in the cluster;
　　receive information with regard to an adjusted configuration from one of the at least one network node, wherein the adjusted configuration decreases a number of the at least two concurrent connections, when a traffic load of the cluster exceeds a predetermined threshold, and wherein the traffic load is indicated by a ratio of a part of the cluster, that is overlapped with one or more other clusters configured for other terminal devices, to a whole of the cluster; and
　　adapt connectivity of the terminal device in the cluster to the adjusted configuration.

17. The apparatus according to claim 16, wherein the adjusted configuration of the cluster further comprises adjustment by at least one of the following:
　one or more of a set of parameters for removing a connection from the cluster;
　one or more of a set of parameters for switching between the concurrent connections for transmission; and
　one or more of a set of parameters for cluster head re-allocation.

18. The apparatus according to claim 16, wherein the adjusted configuration of the cluster is based on at least one of the following:
　a service type for the terminal device; and
　deployment of a wireless network that includes the terminal device.

* * * * *